United States Patent [19]

Miller

[11] Patent Number: 5,508,717

[45] Date of Patent: Apr. 16, 1996

[54] COMPUTER POINTING DEVICE WITH DYNAMIC SENSITIVITY

[75] Inventor: Jerry A. Miller, Ringwood, N.J.

[73] Assignees: Sony Corporation, Tokyo, Japan; Sony Electronics Inc., Park Ridge, N.J.

[21] Appl. No.: 921,006

[22] Filed: Jul. 28, 1992

[51] Int. Cl.⁶ .................................................. G09G 5/08
[52] U.S. Cl. ........................................ 345/145; 345/157
[58] Field of Search ...................... 340/706, 709, 340/712, 721, 723, 724; 178/18; 345/157, 159, 160, 161, 163, 164, 167, 115, 121

[56] References Cited

U.S. PATENT DOCUMENTS

| | | |
|---|---|---|
| 4,251,769 | 2/1981 | Ewert et al. . |
| 4,663,615 | 5/1987 | Hernandez et al. ............... 340/724 |
| 4,786,895 | 11/1988 | Castaneda ........................ 340/724 |
| 4,847,785 | 7/1989 | Stephens . |
| 4,868,549 | 9/1989 | Affinito et al. . |
| 4,908,791 | 3/1990 | Giorgio . |
| 4,961,138 | 10/1990 | Gorniak . |
| 4,975,690 | 12/1990 | Torres ............................ 340/721 |
| 5,073,771 | 12/1991 | Satta et al. ...................... 340/721 |
| 5,159,159 | 10/1992 | Asher ............................. 178/18 |

Primary Examiner—Tommy P. Chin
Assistant Examiner—Gin Goon
Attorney, Agent, or Firm—Jerry A. Miller

[57] ABSTRACT

A pointing device, such as a mouse, for a computer system detects when a pointer controlled by the mouse is within a control zone of a display (e.g., and icon). When it is, the speed factor for the mouse is reduced making it easier for the user to hit an icon.

20 Claims, 2 Drawing Sheets

COMPUTER POINTING DEVICE WITH DYNAMIC SENSITIVITY

BACKGROUND

1. Field of the Invention

This invention relates generally to the field of pointing devices (e.g., joysticks, mice, trackballs, tablets, touchscreens, touchpads, pens, etc.) for computers. More particularly, this invention relates to a pointing device such as a mouse for a computer which provides a enhanced ability to hit a control zone (e.g., icon) of a display.

2. Background of the Invention

Pointing devices such as mice, joysticks, and trackballs are popular for controlling operation of a digital computer. Other types of pointing devices will likely appear in the near future as the field of virtual reality matures. Such pointing devices are currently especially popular in using software with a graphical user interface (GUI) such as Windows™ by Microsoft Corporation and in conjunction with graphics oriented programs such as computer aided drafting systems. Such devices are used to point to "virtual control buttons", "icons", menu selections and in general other areas of the display which represent selections to be made by the user. These areas are designated herein as "control zones". The user, for example, "clicks" a mouse button when a pointer enters one of these control zones of a computer display to select an action for the computer to take.

One of the problems encountered in using such a pointing device is that it is sometimes difficult to determine quickly whether the pointer controlled by the pointing device is actually inside a control zone of the display. This may be especially the case when changing from one computer to another which has a slightly different feel of the pointing device or has a slightly different type of display, software or pointing device. It may also be difficult for people who, due to disease, poor vision, injury or other physical limitations, may have less than perfect eye-hand coordination.

The present invention addresses these problems by providing a mechanism, to reinforce the user's ability to place the pointer within a control zone of the display.

SUMMARY OF THE INVENTION

It is an object of the present invention to provide an improved method for operation of a pointing device which enhances the user's ability to hit a control zone of the display.

It is a feature that the present invention provides this improvement without hardware modifications.

It is an advantage that the present invention the user can more accurately register the pointer in the control zone.

These and other objects, advantages and features of the invention will become apparent to those skilled in the art upon consideration of the following description of the invention.

In general terms, a pointing device, such as a mouse, for a computer system detects when a pointer controlled by the mouse is within a control zone of a display (e.g., and icon). When it is, the speed factor for the mouse is reduced making it easier for the user to hit an icon.

In one embodiment of the present invention, an improved input apparatus for use with a computer having a display includes a pointing device which operates in conjunction with the computer to control a pointer's position on the display. The speed factor is selected to be a first speed factor M for the pointing device when the pointer's position is in a first predetermined position on the display and a second speed factor N for the pointing device when the pointer's position is in a second predetermined position on the display. The second predetermined position can be a control zone or icon of the display and N is preferably less than M so that the pointer's movement slows down when inside the control zone.

A method of operation of a computer pointing device according to the invention includes the steps of: detecting a location of a pointer on a display, where the location of the pointer is controlled by the pointing device; and changing an operational parameter of the pointing device based upon the location of the pointer. The operational parameter is preferably a speed factor relating an amount of movement of the pointer on the display to an amount of movement of the pointing device and the speed factor is reduced when the pointer is within a control zone of the display.

A method of operation of a computer pointing device, according to an embodiment of the invention includes the steps of: detecting a location of a pointer on a display, where the location of the pointer is controlled by the pointing device; changing a speed factor of the pointing device based upon the location of the pointer, wherein the speed factor relates an amount of movement of the pointer on the display to an amount of movement of the pointing device, such that the speed factor is set to a value M when the pointer is not inside a control zone of the display, and the speed is set to a value of N when the pointer is inside the control zone of the display; wherein the speed factor N is a predetermined fractional value of M.

In another embodiment of the invention, a computer system includes a central processor, a display, and a pointing device which operates in conjunction with the computer to control a pointer's position on the display. The central processor determines when the pointer is in a control zone of the display and establishes a speed factor M for the pointing device when the pointer is not in the control zone of the display. It further establishes a speed factor N for the pointing device when the pointer is in the control zone of the display.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
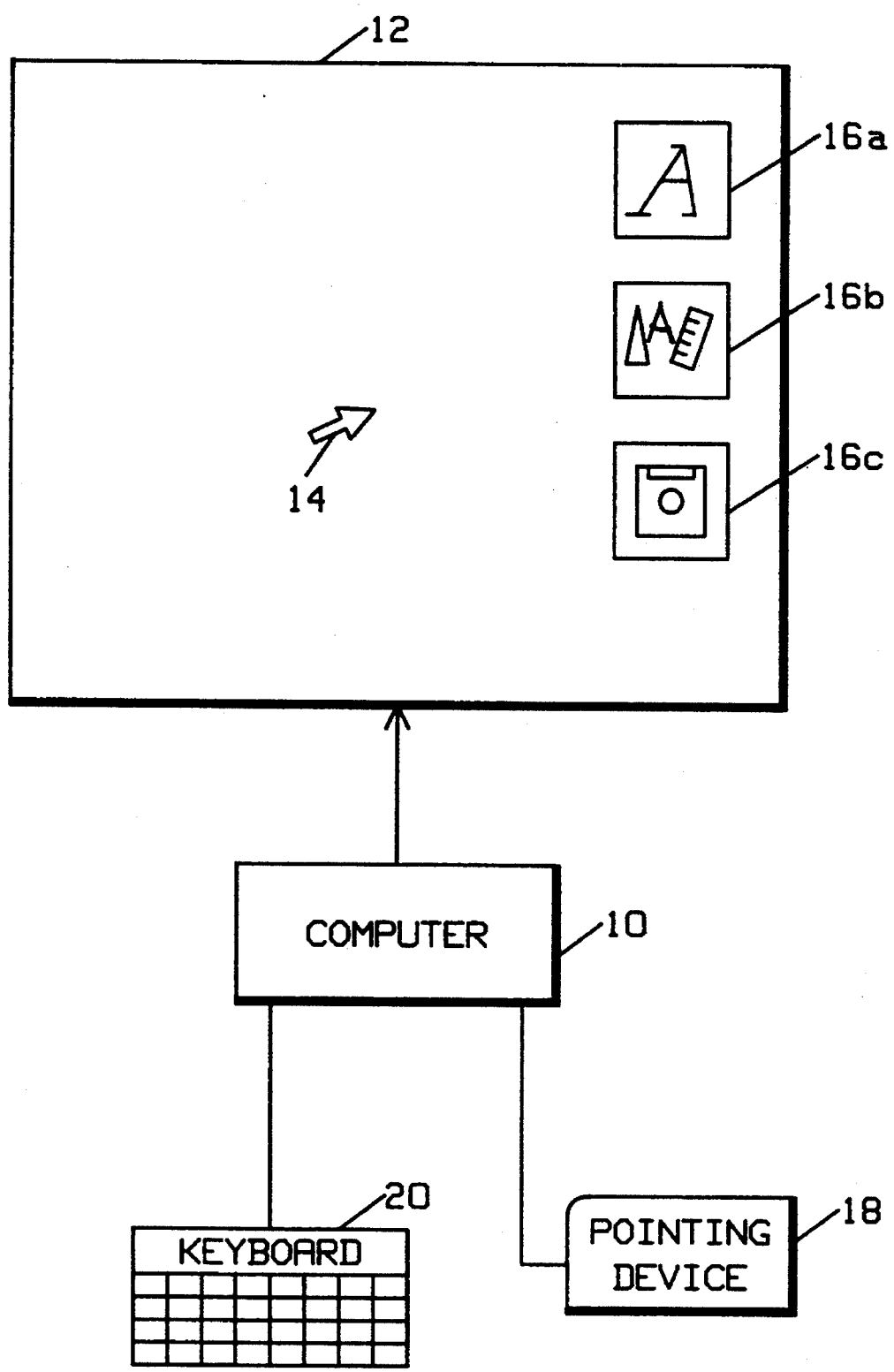
FIG. 1 is a block diagram of a computer system of the present invention.

Turning now to FIG. 1, a computer system utilizing the present invention is seen to include a computer 10 which can be, for example, an IBM PC compatible computer or engineering workstation. A display 12 is used to display information in a more or less conventional manner. The display, under the control of various software may display a pointer 14 such as an arrow, X, cross, cross-hairs, hand, pencil or other figure which can represent a pointing action, which is used to point to various control zones 16a, 16b and 16c (collectively 16 or individually referred to herein as control zones 16) of the display. Graphical symbols or "icons" are often used to represent various actions the software can take.

In the example display of FIG. 1, zone 16a could represent entry into a text processing mode. Zone 16b could represent entering a graphics or drafting mode. Zone 16c might represent various functions relating to diskettes (e.g., copying files, formatting diskettes, etc.). A pointing device 18 is used to control the location of this pointer and can manipulated by the user to cause the pointer to move to the various control zones 16 to effect various operations. A keyboard 20 may also be used as an input device in such a computer system.

In using the computer system, a user manipulates the pointing device 18 to cause the pointer to move about the display until the pointer is in a desired control zone 16. The user then selects the action represented by the control location by actuating a switch 22 on the pointing device. This might, for example, be a control button on a mouse or joystick. The actuation of the switch 22 by the user would cause the computer to implement a function desired by the user.

To enhance the user's ability to interface with the computer, the present invention advantageously modifies an operational parameter of the pointing device whenever the pointer enters the control zone.

Figure 2:
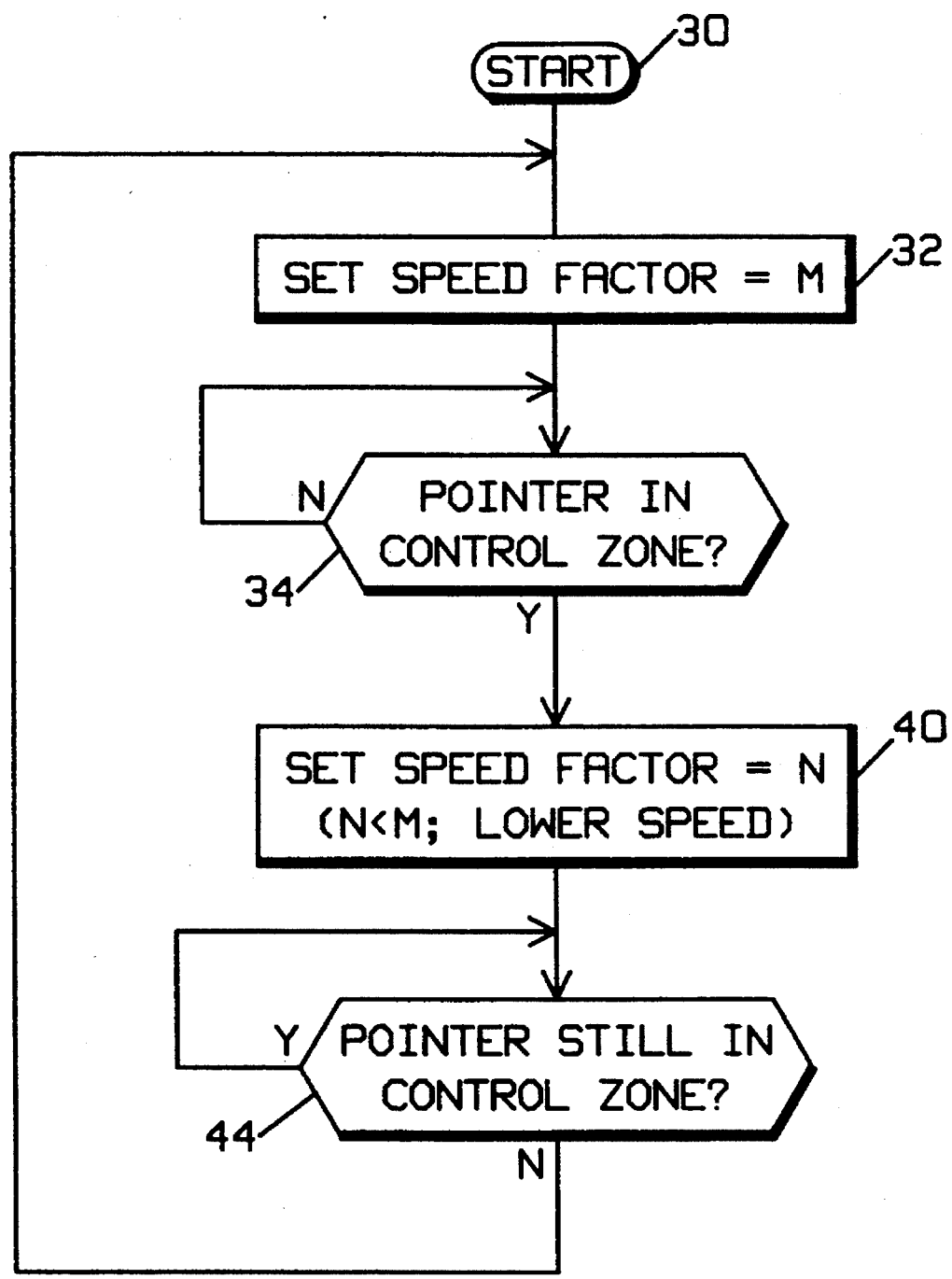
FIG. 2 is a flow chart of operation of the present invention.

Turning now to FIG. 2, a flow chart of the operation of the device of the present invention is described starting with step 30. Those skilled in the art will appreciate that the operation described in conjunction with FIG. 2 may be integrated into a more complex software system in which the operation selected by the user, as described above, is implemented. In other embodiments, such operation could be implemented as a software driver for the particular pointing device in use or a part of an operating system. In any event, the selection of pointer speed factor is implemented by programming to computer 10.

FIG. 2 may require an assumption that the pointer is initially outside a control zone depending upon the embodiment. At step 32, the speed factor for the pointing device is set to a predetermined value represented by the variable M. The "speed factor" referred to herein is a parameter which relates the amount of movement on the computer display of the pointer for a given movement of the mouse. This speed factor is known by various other names (e.g. acceleration factor, etc.) by various pointer or software or hardware manufacturers. The speed factor is in general user selectable.

At step 34, the process determines whether or not the pointer has entered a control zone of the display. If not, the process loops until a control zone is entered. When a control zone is entered, control passes to step 40 wherein the speed factor is reduced to a value represented by N. Thus, whenever the pointer enters a control zone, the pointer slows down with relation to the speed of movement of the pointing device making it easier for the user to keep the pointer within the control zone.

At step 44, the process inspects to see if the pointer is still in the control zone and loops until the pointer leaves the control zone. When the pointer leaves the control zone, control returns to step 32 where the speed factor returns to the normal value of M.

The actual implementation of this slowdown of the pointing device's speed factor may be implemented in a number of ways. For example, the user may be required to select both M and N during a setup procedure for the hardware or software. In another embodiment, N can be established for the user as a predetermined fraction of M. For example N can be selected to be 50% or 75% of M. In order to optimize speed of operation of the software, it may be desirable for M and N to be integers or powers of 2. Those skilled in the art will appreciate that several such variations are possible. The optimal design will likely depend upon user preference, control zone size and type of pointing device as well as other factors.

The present invention can also be thought of in opposite terms. That is, the pointer can be viewed as speeding up whenever it is not in a control zone. Skilled users will likely think in these terms since the pointing device's speed factor is generally selected to be the fastest which a user can control. Since the present invention enables greater control of the pointing device, the pointing device's speed factor can be increased over that normally controllable by a given user.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. An improved input apparatus for use with a computer having a display, comprising in combination:

a pointing device which operates in conjunction with said computer to control a pointer's position on said display; and speed factor selecting means for automatically selecting a first speed factor M for said pointing device when said pointer's position is placed in a first predetermined position on said display and for automatically selecting a second speed factor N for said pointing device when said pointer's position is placed in a second predetermined position on said display.

2. The apparatus of claim 1, wherein said pointing device comprises a mouse.

3. The apparatus of claim 1, wherein said pointing device comprises a joystick.

4. The apparatus of claim 1, wherein said pointing device comprises a digitizing pad.

5. The apparatus of claim 1, wherein said pointing device comprises a trackball.

6. The apparatus of claim 1, wherein N is less than M and wherein said second predetermined position comprises a control zone of said display.

7. The apparatus of claim 6, wherein M is a user selected value and N is a predetermined fractional value of M.

8. The apparatus of claim 1, wherein M and N are both user selected values.

9. A method of operation of a computer pointing device, comprising the steps of:

detecting a location of a pointer on a display, where said location of said pointer is controlled by said pointing device; and automatically changing an operational parameter of said pointing device based upon said location of said pointer, wherein said parameter includes a speed factor relating an amount of movement of said pointer on said display to an amount of movement of said pointing device.

10. The method of claim 9, wherein said parameter is changed when said pointing device enters a control zone of said computer display.

11. The method of claim 9, wherein said parameter is changed when said pointing device enters a control zone of said computer display.

12. The method of claim 11, wherein said speed factor is reduced whenever said pointer enters said control zone and increases whenever said pointer exits said control zone.

13. The method of claim 12, wherein said speed factor is assigned a value of M whenever said pointer is outside said control zone and is assigned a value of N whenever said pointer is inside of said control zone.

14. The method of claim 13, wherein said speed factor N is a predetermined fractional value of M.

15. A method of operation of a computer pointing device, comprising the steps of:

detecting a location of a pointer on a display, where said location of said pointer is controlled by said pointing device; and changing a speed factor of said pointing device automatically based upon said location of said pointer, wherein said speed factor relates an amount of movement of said pointer on said display to an amount of movement of said pointing device, such that said speed factor is set to a value M when said pointer is not inside a control zone of said display, and said speed is set to a value of N when said pointer is inside said control zone of said display; and wherein said speed factor N is a predetermined fractional value of M.

16. A computer system, comprising in combination:

a central processor;

a display;

a pointing device which operates in conjunction with said computer to control a pointer's position on said display;

means for determining when said pointer is in a control zone of said display; and means for automatically establishing a speed factor M for said pointing device when said pointer is not in said control zone of said display and for establishing a speed factor N for said pointing device when said pointer is in said control zone of said display.

17. A computer system, comprising in combination:

a central processor;

a display;

a pointing device which operates in conjunction with said computer to control a pointer's position on said display;

means for determining when said pointer is in a control zone of said display; and means for establishing a speed factor M for said pointing device when said pointer is not in said control zone of said display and for establishing a speed factor N for said pointing device when said pointer is in said control zone of said display.

18. The apparatus of claim 17, wherein said speed factor N is less than said speed factor M.

19. The apparatus of claim 18, wherein said speed factor N is a predetermined fractional value of M.

20. The apparatus of claim 19, wherein said speed factor M is a user defined speed factor.

* * * * *